United States Patent [19]

Marcus et al.

[11] Patent Number: 5,070,302
[45] Date of Patent: Dec. 3, 1991

[54] CAPACITANCE PROBE FOR MEASURING A WIDTH OF A CLEARANCE BETWEEN PARTS

[75] Inventors: Michael A. Marcus, Honeoye Falls; Ernest A. Graff, Ontario, both of N.Y.

[73] Assignee: Eastman Kodak Company, Rochester, N.Y.

[21] Appl. No.: 402,285

[22] Filed: Sep. 5, 1989

[51] Int. Cl.$^5$ ............................................. G01R 27/26
[52] U.S. Cl. .................................... 324/662; 324/661; 324/688; 324/690
[58] Field of Search ........ 324/658, 661, 662, 686–688, 324/690, 452, 454, 456, 457, 458; 340/870.37

[56] References Cited

U.S. PATENT DOCUMENTS

| | | | |
|---|---|---|---|
| 3,269,180 | 8/1966 | Schreiber | 73/215 |
| 3,706,980 | 12/1972 | Maltby | 340/244 |
| 3,781,672 | 12/1973 | Maltby et al. | 324/61 |
| 3,784,897 | 1/1974 | Norrie | 340/870.37 |
| 3,815,020 | 6/1974 | Mayer | 324/61 |
| 4,008,433 | 2/1977 | Fasser et al. | 324/61 |
| 4,064,753 | 12/1977 | Sun et al. | 73/304 |
| 4,103,226 | 7/1978 | Fromson et al. | 324/601 X |
| 4,318,042 | 3/1982 | Eda et al. | 324/72.5 |
| 4,389,610 | 6/1983 | Schiebel et al. | 324/72.5 |
| 4,439,725 | 3/1984 | Ogasawara | 324/61 |
| 4,449,179 | 5/1984 | Meyer | 324/61 |
| 4,451,780 | 5/1984 | Ogasawara | 324/61 |
| 4,482,860 | 11/1984 | Risko | 324/690 X |
| 4,625,176 | 11/1986 | Champion et al. | 324/458 |
| 4,675,670 | 6/1987 | Lalonde et al. | 340/870 |
| 4,760,342 | 7/1988 | Conrads et al. | 324/457 |
| 4,766,368 | 8/1988 | Cox | 324/61 |
| 4,804,905 | 2/1989 | Ding et al. | 324/61 |
| 4,818,945 | 4/1989 | Bossard | 324/457 |
| 4,823,071 | 4/1989 | Ding et al. | 324/61 |
| 4,841,224 | 6/1989 | Chalupnik | 324/61 |
| 4,924,172 | 5/1990 | Holmgren | 324/664 |
| 4,931,887 | 6/1990 | Hegde et al. | 360/75 |
| 4,935,700 | 6/1990 | Garbini et al. | 324/687 |

FOREIGN PATENT DOCUMENTS

| | | |
|---|---|---|
| 0128874 | 8/1984 | European Pat. Off. |
| 2851792 | 6/1979 | Fed. Rep. of Germany |
| 8706280.1 | 7/1987 | Fed. Rep. of Germany |
| 2043271A | 2/1979 | United Kingdom |

OTHER PUBLICATIONS

Encylopedia of Polymer Science and Engineering, J. Wiley & Sons, N.Y., 12-1989, vol. 5, p. 458.
Encyclopedia of Chemical Technology, J. Wiley & Sons, 12-1978, N.Y., pp. 802-803.

*Primary Examiner*—Jack B. Harvey
*Attorney, Agent, or Firm*—Charles E. Snee

[57] ABSTRACT

A capacitance probe (10) includes readily removable outer layers (64,66) which facilitate its use in the field to measure the width of slots or clearances (12) of different widths; an optionally perforated guard electrode (64,66,76,82) which permits width measurements over wider side wall bands with minimal effect on sensitivity; convergent or tapered side edges (102) to ease insertion and movement of the probe and a carrier block (124) which ensures proper positioning of the probe within such slots.

16 Claims, 6 Drawing Sheets

CAPACITANCE PROBE FOR MEASURING A WIDTH OF A CLEARANCE BETWEEN PARTS

DESCRIPTION

1. Technical Field

The present invention concerns capacitance probes useful to measure the width of slots or clearances between electrically conductive parts. More particularly, the invention concerns improvements in probe structure which permits adaptation to slots of substantially different nominal widths, measurement of slot width over an increased depth or width or both within the slot with minimal loss of sensitivity, and reproducible positioning of the probe within the slot during measurement.

2. Background Art

For many years, a variety of electrical probes have been used in science and industry for measuring properties or characteristics such as fluid flow, clearances, moisture content, fluid level, material composition, electrostatic condition and the like. Though each particular application has its own peculiarities which influence probe structure and mode of use, a common structure for such probes has been superposed or concentric layers of materials which constitute the probe electrodes, insulating or dielectric materials and other elements.

For example, U.S. Pat. No. 3,269,180 to Schreiber discloses a capacitive electrode for flow measurement in open channels in which a specially shaped electrode is encased in a dielectric sheath and provided with a guard or shield electrode on the exterior of the sheath. U.S. Pat. Nos. 3,706,980 and 3,781,672 to Maltby show radio frequency systems for measuring the level of fluids, in which concentric probe and guard electrodes are used to measure the impedance of the fluid as an indicator of its depth. U.S. Pat. No. 4,064,753 to Sun teaches that the probe and guard electrodes should be located on a common surface in a fluid level measuring system, rather than in separate layers as previously had been the practice. Similarly, U.S. Pat. No. 4,318,042 to Eda discloses the use of coplanar probe and guard electrodes at essentially the same potential, with the guard electrode extending around virtually the entire perimeter of the probe electrode, to protect the probe electrode from stray voltages that would produce measurement errors.

In another capacitance probe known to the inventors and used for measuring the width of slots or clearances between electrically conductive parts, the probe electrode was formed from a thin, stainless steel, chemically etched blank which was covered on both sides with a thin layer of unsupported thermoplastic adhesive and heat sealed. In some applications, guard electrodes also were used which were coplanar with the probe electrodes. The resultant structure was then covered on both sides with a thin metallized dielectric layer, in which sensing windows were then cut above the tip of the probe electrode to define the active area of the probe. This thin metallized layer, once the sensing windows were cut, functioned as an overlying guard electrode in the finished probe. A lead foil contact was then attached between the coplanar guard electrode and the metallized layer. After the delicate window cutting operation was completed, the whole was then wrapped in polytetrafluorethylene (PTFE) tape and heat sealed; so that, the completed laminated structure could not be disassembled without destroying the probe.

These latter types of probes were difficult to make and numerous problems were encountered. The overall thickness of the probes tended to vary rather widely, which led to unwanted wobble of the probes when they were moved along clearances to make measurements of width over a distance. Furthermore, since the probes typically were only clamped in a holder during use, they tended to move within the holder, thus leading to inaccurate or unreproducible measurements. For the same reason, the users of such probes might position them differently within the clamp type holders for measurement, leading to other types of inaccuracies. The laborious, manual process of manufacture of such probes also contributed to problems with accurate positioning of the probe electrode within the probe and beneath the sensing windows, poor electrical contacts, unpredictable contact resistances, and low yields due to such variables.

Thus, while probes of the various types discussed above have experienced a certain degree of acceptance in science and industry, a need has continued to exist for a probe, particularly a capacitance probe for measuring the width of slots or clearances, which is simple and reproducible to manufacture and use.

SUMMARY OF THE INVENTION

A principal objective of the present invention is to provide an improved capacitive probe which can be manufactured in significant quantities with a minimum of manual steps, yet which is simple and robust during use in an industrial environment.

Another objective of the present invention is to provide such a probe which can be readily adapted for use to measure clearances of substantially different nominal widths, using the same basic probe geometry.

Still another objective of the present invention is to provide an improved carrier for such a probe in which the probe is mounted substantially to eliminate movement of the probe relative to the carrier and to minimize movement of the carrier relative to the clearance being measured.

Yet another objective of the present invention is to provide a capacitance probe which can be used to measure width over an increased depth or width or both within the slot or clearance being measured, without requiring recalibration of the instrumentation responding to the probe and without substantial loss of sensitivity.

These objectives of our invention are given only by way of example. Thus, other desirable objectives inherently achieved by the disclosed invention may occur to or become apparent to those skilled in the art. Nonetheless, the scope of the invention is to be limited only by the appended claims.

In one embodiment of the invention, improvements are made to a capacitance probe for measuring width of a slot or clearance, of the type including a least one thin, flat probe electrode having front and back sides, a first layer of dielectric material fixedly adhered to such front side, a second layer of dielectric material adhered to such back side and a thin, flat guard electrode fixedly adhered to the outer surface of at least one of such layers of dielectric material, the guard electrode having through its thickness an opening opposite the tip of the probe electrode, to define the active area of the probe. So that the probe may be used in slots having a considerable range of nominal widths to be measured, it further includes a first layer of high lubricity material manually peelably adhered to one outer surface of the probe and a second layer of such material manually peelably adhered to the other outer surface of the probe. Because these latter layers are manually peelably adhered to the sides of the probe, they may be stripped off when worn and replaced to refurbish a probe for continued use in a given application or may be replaced with similar layers of thicker or thinner manually peelably adhered material to adapt the probe for use in slots with significantly different ranges of widths to be measured.

As used in this specification, "fixedly adhered" means that the layer thus attached is not intended to and typically cannot be removed by simple manual techniques without damaging the device; whereas, "manually peelably adhered" means that the layer thus attached is definitely intended to and indeed can be removed by simple manual techniques, such as grasping the edges of the layer with the fingers and pulling.

In another embodiment of the invention, the general type of capacitance probe described above is provided in its guard electrode with a plurality of perforations through the thickness of the electrode at the location opposite the tip of the probe electrode. These perforations permit the underlying probe electrode to be larger and yet expose through the perforations the same active area on the probe electrode as on a probe not having such a perforated guard electrode. The larger probe electrode enables the probe to measure slot width over an enlarged side wall area of a slot or clearance, with about the same sensitivity as a probe not having such a perforated guard electrode and measuring over a smaller side wall area.

In accordance with a further embodiment of the invention, the general type of capacitance probe described above is provided with an electrically conductive carrier block for the probe, the block having a substantially flat side to which the probe is attached by means which pierce the probe electrode and guard electrode at a total of at least two points, to provide not only good electrical contact, but also a secure mechanical joint. The portion of the probe comprising the active area of the probe electrode extends beyond the perimeter of the flat side to permit insertion into the slot or clearance. To further facilitate insertion of the probe into and movement along the slot, the lateral edges of the probe preferably are tapered toward one another in the direction away from the carrier block.

BRIEF DESCRIPTION OF THE DRAWINGS

The foregoing and other objects, features and advantages of our invention will be apparent from the following more particular description of the preferred embodiments of the invention, as illustrated in the accompanying drawings, in which.

DETAILED DESCRIPTION OF THE PREFERRED EMBODIMENTS

The following is a detailed description of the preferred embodiments of the invention, reference being made to the drawings in which the same reference numerals identify the same elements of structure in each of the several Figures.

Figure 1:
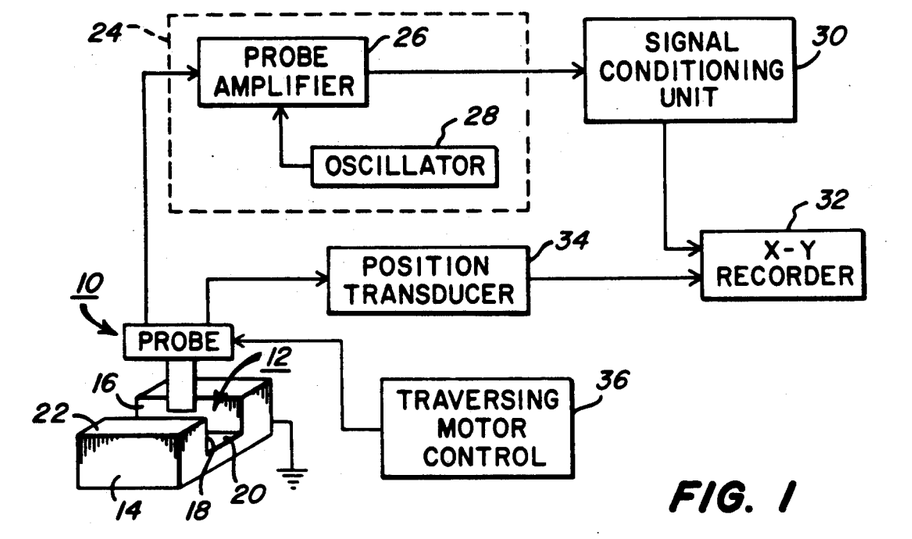
FIG. 1 shows a schematic representation of a slot width measurement system in which the probes according to the invention may be used.

Referring to FIG. 1, the general operation will be explained of a system which measures slot width using a probe 10 according to the invention. The active portion of probe 10 is inserted into the slot or clearance 12 in structure 14, the width of which slot is to be measured. Slot 12 typically will include side walls 16, 18 and may include a bottom wall 20. The outer edges of slot 12 often are bounded by flat lips 22 on which probe 10 may slide, as will be discussed subsequently. Probe 10 forms a capacitance with the grounded structure 14 and is powered and monitored by a conventional capacitance meter 24 such as a Model AS-2021-SAI made by Mechanical Technologies, Inc. of Latham, N.Y. Meter 24 may include a probe amplifier 26 and reference oscillator 28 and delivers its output to a signal conditioning unit 30 useful primarily during calibration to set the span of the instrument. The output of unit 30 is fed to a conventional strip chart or X-Y recorder. Probe 10 may be used to measure the width of slot 12 at a single location, if desired; but typically, it will be traversed along the length of the slot to permit measurement of the width profile along such length. This traversal may be done manually or automatically, but in either case a conventional position transducer 34 will be used to monitor the location of probe 10 along slot 12 and provide a signal to recorder 32. Where an automatic traversing mechanism is used, not illustrated, a traversing motor control 36 preferably is connected between the traversing motor and the probe to synchronize the operation of recorder 32 with the movement of probe 10. The results of each traverse of probe 10 are recorded and used as desired to evaluate the condition of slot 12.

Figure 2:
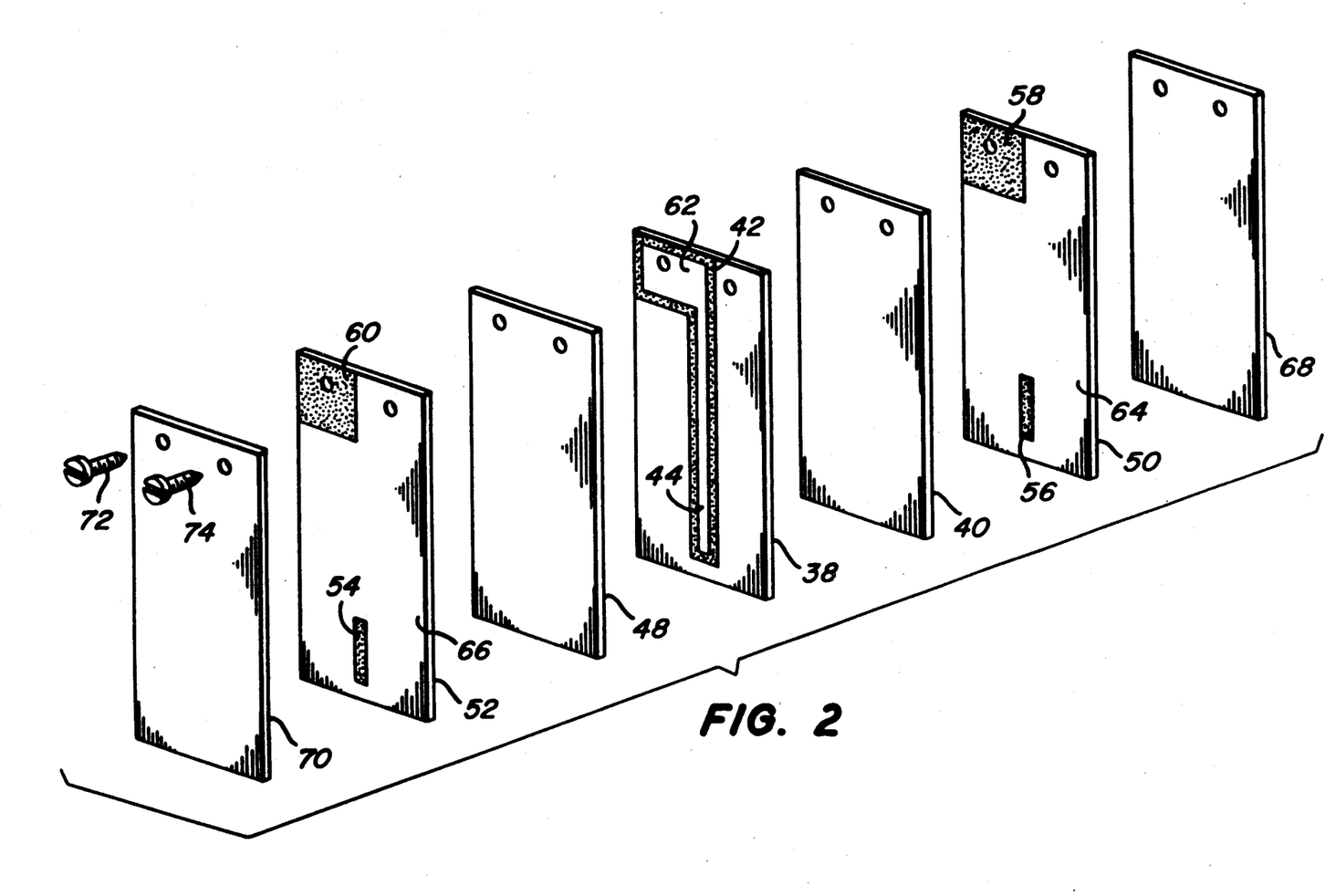
FIG. 2 shows an exploded perspective view of one embodiment of the invention, illustrating how the various probe and guard electrode layers are configured and assembled.

FIG. 2 illustrates one embodiment of the invention comprising seven layers or laminae. A central layer 38 and a first outer layer 50, which preferably are made from 0.0005 to 0.005 inch (0.00127 to 0.0127 cm) stainless steel for resistance to flexure, but also may be made from other metals, are laminated to opposite sides of a 0.001 to 0.003 inch (0.00254 to 0.00762 cm) layer 40 of an electrically insulative adhesive such as DuPont Pyralux LF0100, a staged modified acrylic material. Stainless steel is preferred for layers 38 and 50 since for a given set of desired performance characteristics, a steel electrode can be made much thinner than, say, a copper one. This thinness is significant since during lamination etched electrodes of thicker material are more prone to cut through the adjacent insulative layers and cause shorting to the guard electrodes. An adhesive such as Pyralux LF0100 will laminate well at temperatures around 177 degrees centigrade under a pressure of about 150 to 200 psi (1034 to 1379 kPa) for approximately one hour. Then layers 38 and 50 are etched using conventional photoresist techniques to remove completely from layer 38 the narrow band 42, shown shaded for ease of illustration, and thus define in layer 38 an elongated central probe electrode 44 and a coplanar, surrounding guard or shield electrode 46; and in layer 50 to define an opening or window 56 through the thickness of layer 50 just opposite the tip of probe electrode 44 and to remove completely corner portion 58 to permit electrical connection to the connector pad 62 left on probe electrode 44. Band 42 preferably is 0.001 to 0.020 inch (0.00254 to 0.0508 cm) in width all around probe electrode 44, to ensure adequate isolation from guard electrode 46. Window 56 is sized to be smaller than the underlying tip of probe electrode 44; so that, its edges extend inwardly beyond the underlying edges of the probe electrode. As a result, the guard electrode layer will resist any outward deformation of the probe electrode. A second layer 48 of adhesive and a second outer layer 52 of stainless steel are then laminated to the etched surface of layer 38. Layer 52 is then etched using conventional photoresist techniques to define opening or window 54 through the thickness of layer 52 just opposite the tip of probe electrode 44 and to remove completely corner portion 60 to permit electrical connection to the connector pad 62 left on probe electrode 44. For ease of illustration, openings 54, 56 and corner portions 58, 60 are shown shaded. With windows 54, 56 and portions 58, 60 removed, the remainders of layers 50, 52 form front and back guard electrodes 64, 66. Those skilled in the art will appreciate that the laminating and etching steps just described may be performed in various sequences and also for a large number of probes simultaneously, after which the individual probes may be cut from the larger lamination using any convenient means.

Finally, outer layers 68, 70 are added which may be fixedly adhered (laminated) layers of the insulative adhesive mentioned previously; however, it is preferred that layers 68, 70 be made from a manually peelably adhered material such as DuPont CHR HM225 polytetrafluoroethylene (Teflon or PTFE) tape or the like. Preferably, the thickness of such tape should be less than 0.003 inch (0.00762 cm) for the example given above. Polyimide and polyester tapes are also acceptable; however, the relatively higher degree of lubricity of PTFE makes it preferable due to ease of inserting and traversing probe 10. Such tapes can be obtained readily in various thicknesses, thus enabling the user of the probe to adjust its thickness in the field to suit the particular slot 12 or simply to replace the layers 68, 70 as the probe 10 becomes worn in use. It is preferred that layers 68, 70 be of sufficient thickness to establish a lateral clearance of less than 0.0005 inch (0.00127 cm) to minimize decentering errors in measurement. Where it becomes necessary to add more layers of tape to fit a particular slot, some decrease in accuracy is to be expected, which can be corrected by using a probe with a larger active area. Alternatively, a probe of the type shown in FIG. 9 may be used for such wider slots or clearances. Regardless of which material is selected for layers 68, 70, means such as screws 72, 74, preferably of brass, are used to establish the necessary electrical connections between probe electrode 44, guard electrodes 64, 66 and the meter system of the type shown in FIG. 1. The details of the preferred method of mounting such a probe will be explained further with regard to FIG. 8.

Figures 3A, 3B:
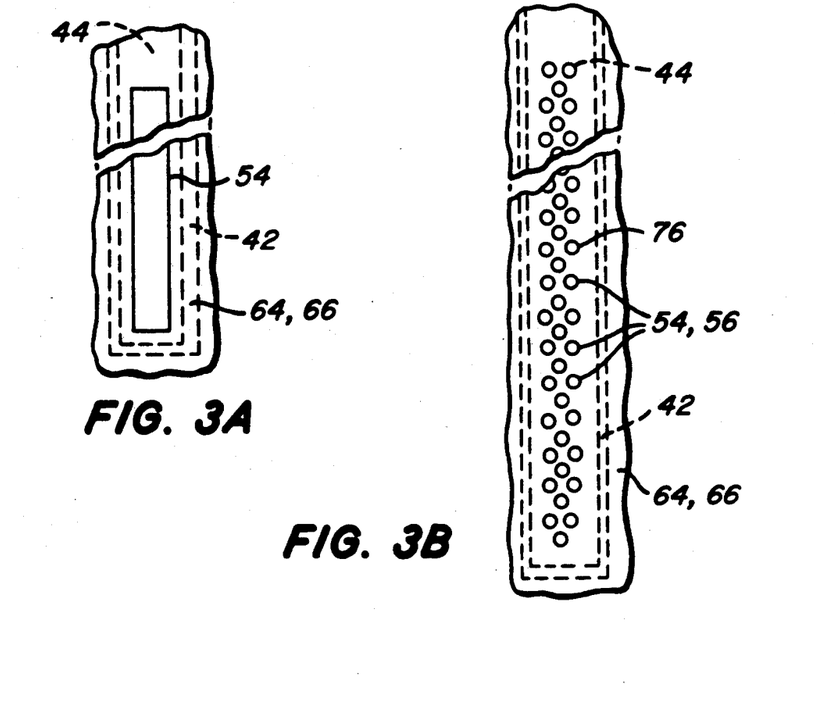
FIG. 3A shows a greatly enlarged fragmentary plan view of the tip of a probe electrode and a guard electrode window, illustrating their relative sizes.
FIG. 3B shows a greatly enlarged fragmentary plan view of the tip of a probe electrode and a guard electrode window for the embodiment in which the guard electrode has been provided with perforations substantially equal in area to the window of FIG. 3A, to permit an increase in the size of the side wall area swept by the probe but without changing sensitivity.

FIG. 3A shows a greatly enlarged fragmentary view of the tip of probe electrode 44 and overlying window 54. In one application, windows 54, 56 were 0.030 inch (0.0762 cm) wide and 0.480 inch (1.219 cm) high, while the tip on probe electrode 44 was 0.050 inch (0.127 cm) wide and 0.500 inch (1.27 cm) long. Since windows 54, 56 were smaller than the tip of electrode 44, the active area of the probe was the area of the windows, or 0.0144 square inches (0.0929 square cm.). Suppose, now, that it is desired to measure the width of a slot across a larger side wall area having a depth of 0.920 inch (2.337 cm). One way to do this would be to use a plurality of probes having their probe electrodes located at progressively deeper levels in the slot or clearance. Or, such a measurement can be made using a longer probe electrode of the same width, in combination with specially configured windows, as shown schematically in FIG. 3B. In the latter case, applicants have found, surprisingly, that the calibration, amplifier gain and sensitivity of the probe will not require adjustment for such a larger probe electrode tip; provided that, the active area of the probe, as seen through windows 54, 56, remains essentially unchanged. To maintain such a constant active area, applicants have found that single windows 54, 56 may be replaced by a plurality of perforations 76 so that the combined open area of the perforation 76 may essentially the same as the active area of each of the single windows 54, 56 shown in FIG. 3A. Those skilled in the art also will appreciate that such perforation also may be used to expose the same active area of a much wider probe, to permit measurements across an increased portion of the length of a slot or clearance. Perforations 76 may be formed using conventional photoresist techniques, by laser machining or other methods familiar to those in the art. Applicants have found that perforations having a nominal diameter of 0.010 inch (0.0254 cm) or greater are preferable; however, other shaped or sized openings are also within the scope of this embodiment of the invention. For example, rather than circular perforations 76, concentric annular gaps similar to gap 42 or groups of short straight or curved gaps could also be used, so long as the active area remains substantially the same as the tip of the probe is enlarged. As used in this specification, "perforations" means any types of openings through the guard electrode above the tip of the probe electrode, whose total area is selected to maintain an essentially constant active area, as previously described.

Figure 4:
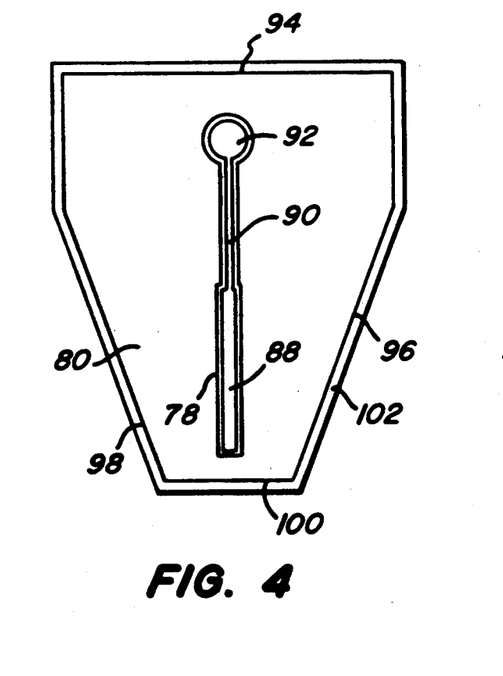
FIG. 4 shows a plan view of the preferred probe and coplanar guard electrode of the invention.
Figure 5:
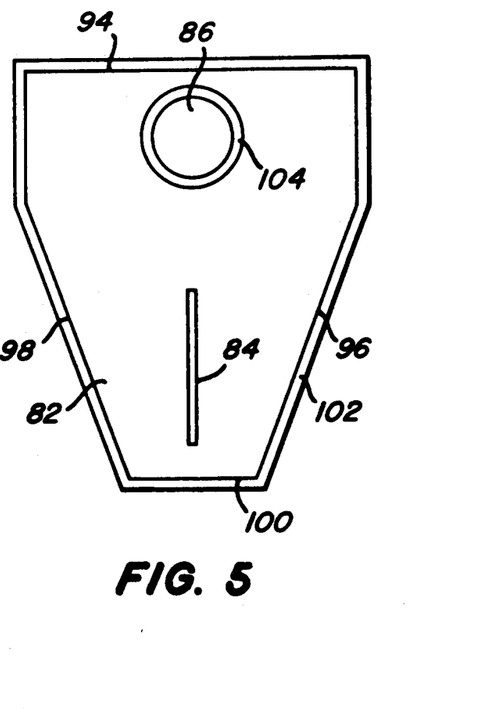
FIG. 5 shows a plan view of the preferred overlying guard electrode with sensing window of the invention.
Figure 6:
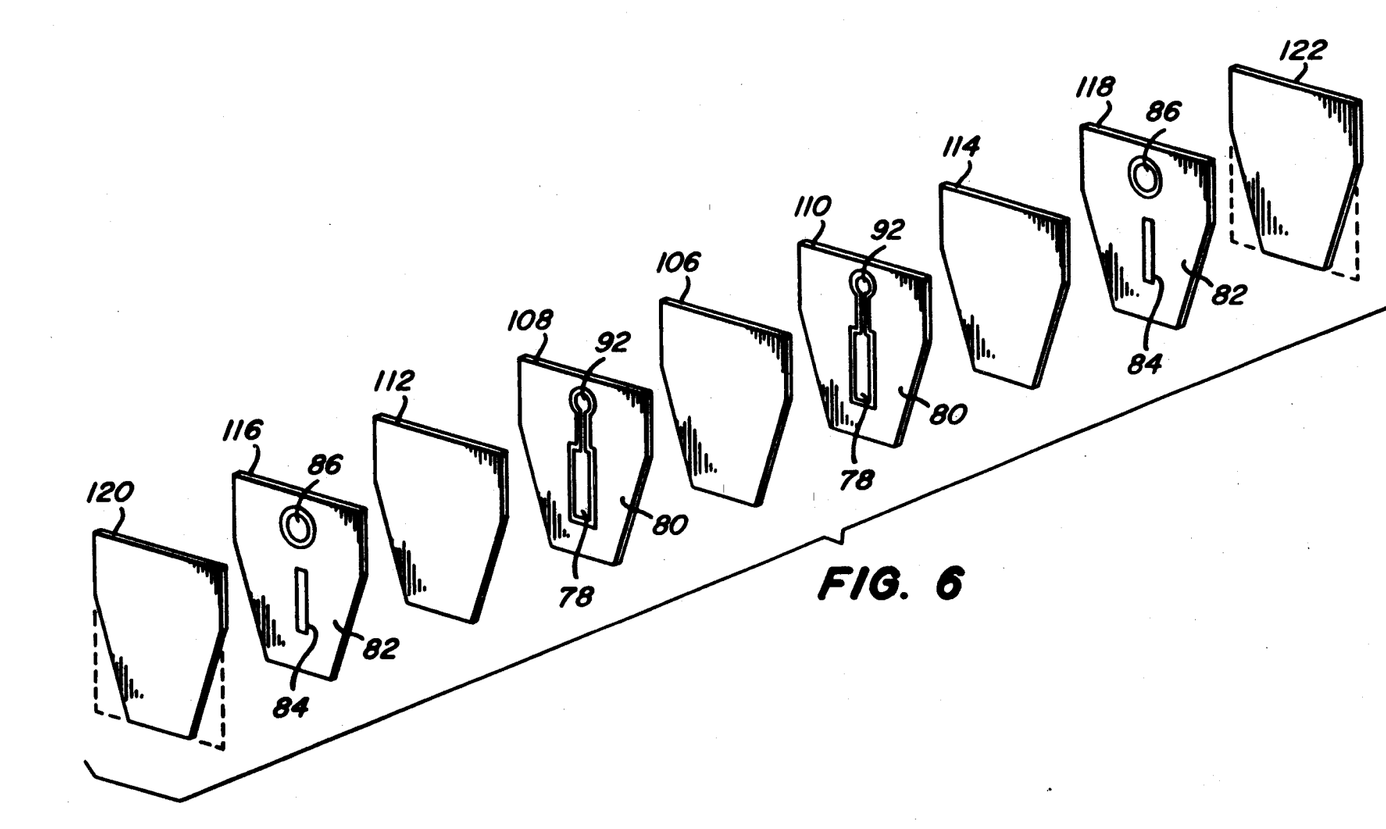
FIG. 6 shows an exploded view of a preferred probe made using the electrode structures of FIGS. 4 and 5, illustrating how the layers are assembled.
Figure 7:
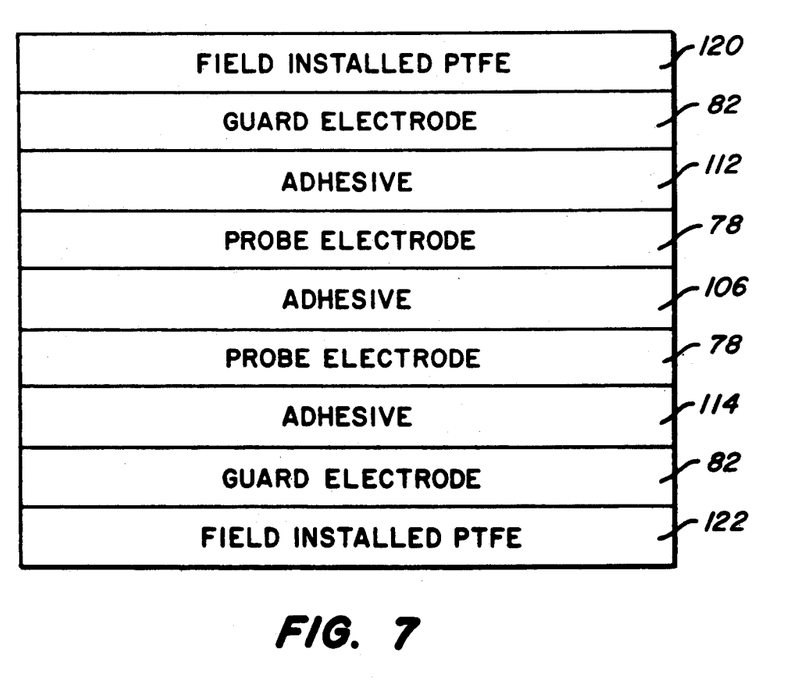
FIG. 7 shows a schematic illustration of the several layers of the probe of FIG. 6.

Although the embodiment of FIG. 2 performs well, applicants have found that the use of two probe electrodes connected in parallel gives superior results. Thus, the nine layer probe structure of FIGS. 4 to 8 was developed and is the preferred embodiment of our invention. FIGS. 4 and 5 show, respectively, the as-etched configurations of the probe electrodes 78 and their coplanar guard electrodes 80; and the as-etched configurations of the overlying guard electrodes 82 with their windows 84 and probe connector pads 86. Perforations also may be used in this embodiment for the reasons just described. The same materials are used for the electrodes, insulating layers and manually peelably adhered layers of this embodiment as have been described for the embodiment of FIG. 2. As in the previous embodiment, the completed probe, other than the outer peelable layers, may be made using conventional laminating and photoresist etching techniques.

In one actual embodiment of the probe of FIGS. 4 to 8, the tip 88 of probe 78 was 0.583 inch (1.481 cm) long and 0.047 inch (0.119 cm) wide and was connected by a lead 90 0.020 inch (0.0508 cm) wide to a connector pad 92 located to be concentric with pad 86. A 0.020 inch (0.0508 cm) band of material was etched through the thickness of the stainless steel layer surrounding probe electrode 78 to isolate it from surrounding guard electrode 80. From a point below the upper edge 94, the opposite sides 96, 98 were tapered inwardly to lower edge 100. Such tapered edges were found to ease considerably the insertion of the probe into the slot to be measured and the movement of the probe along the slot during measurement. The over- and under-lying layers of insulation were of a geometrically similar shape but were 0.040 inch (0.102 cm) larger on all edges, as indicated schematically by the borders 102 in FIGS. 4 and 5. In the same embodiment, windows 84 were approximately 0.563 inch (1.430 cm) long and 0.027 inch (0.686 cm) wide. Connector pads 86 were roughly twice the diameter of connector pads 92 and were separated from the surrounding guard electrodes by a gap 104 about 0.040 inch (1.016 cm) wide etched through the thickness of the stainless steel layer.

The assembly process for the probe of FIGS. 4 to 8 was similar to that of the embodiment of FIG. 2. A central layer 106 of insulative adhesive of the type previously described was laminated on each side to layers 108, 110 of stainless steel of the same type and the stainless steel layers were then etched to produce the probe electrode geometries shown in FIG. 4. Because the thin stainless steel used to produce the electrodes is made by a rolling process, it tends to bow preferentially to one side, a characteristic which may cause the completed probe to bow if the layers are not assembled in accordance with our invention. Particularly, in addition to overlapping the edges of each probe electrode with the edges of the window of the guard electrode, as previously described, the layers comprising the probe electrodes 78 and guard electrodes 80 preferably are assembled so that their tendencies to curve will be in opposite directions, thereby cancelling each other. Similarly, the overlying guard electrodes 82 are faced oppositely to cancel their tendencies to curve.

Further layers 112,114 of insulative adhesive and further layers 116,118 of stainless steel were then laminated over the electrode geometries just produced, after which layers 116,118 were etched to produce the guard electrode and window geometries shown in FIG. 5. The outer layers 120,122 of manually peelably adhered material were added following lamination and etching of the other layers, as needed to achieve the desired overall thickness of the probe, and then trimmed as necessary to conform to the geometry of the laminated layers, as indicated in phantom in FIG. 6.

Figures 8, 9:
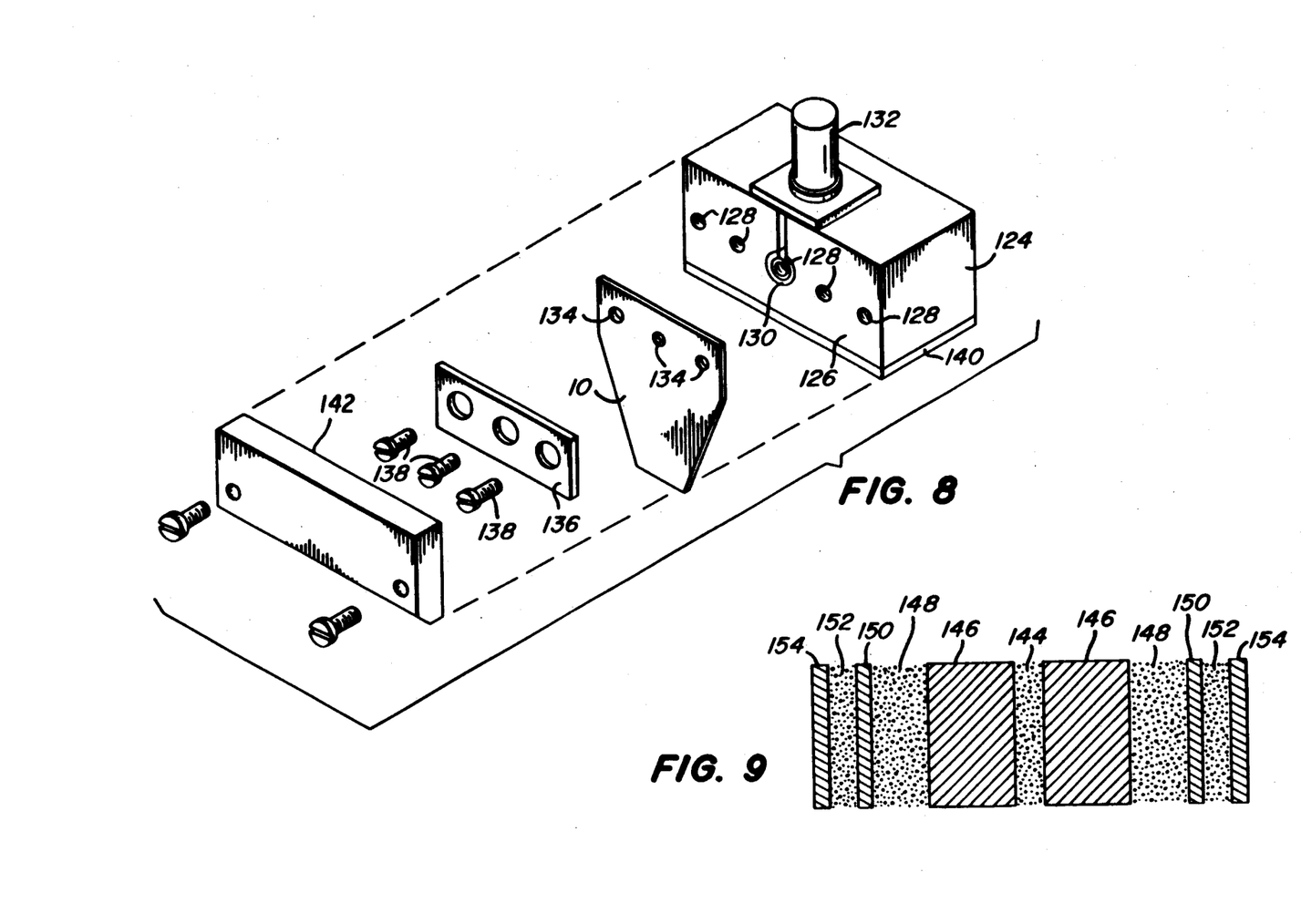
FIG. 8 shows an exploded view of a preferred probe and carrier block of the invention.
FIG. 9 shows a schematic illustration of the several layers of yet another embodiment of the invention.

FIG. 8 illustrates how the completed probe 10 is mounted for use. A carrier block 124, preferably made of brass, is provided on one flat face 126 with a row of tapped holes 128, preferably five in number. The central one of holes 128 is fitted with an electrically insulative liner 130 having a tapped conductive sleeve at its center, not illustrated. This sleeve is electrically connected to a read out terminal 132 attached to the top of the carrier block; and in use terminal 132 is connected to meter 24 as shown in FIG. 1, while carrier block 124 is driven at the same electrical potential as the probe and guard electrodes. Probe 10 is provided with a line of drilled holes 134, preferably three in number, the center one of which passes through connector pads 86 and 92 and the outer ones of which pass through guard electrodes 80 and 82. Applicants have found that due to the use of multiple connectors for probe 10, one for the probe electrodes and at least one, preferably two, for the guard electrodes, the positioning of the probe on block 124 is much more stable and accurate than if prior art clamping techniques were used.

An optional insulative spacer 136, which may be made from PTFE, includes a corresponding line of bores through which conductive screws 138 are driven through holes 134 to connect the probe electrodes to terminal 132 and the guard electrodes to carrier block 124. If the lip 22 of slot 12 is of electrically conductive material, a layer 140 of electrically insulative material must be provided on the contact surface of block 124. PTFE is preferred for layer 124 due to its high lubricity as well as its insulative properties. Finally, a front cover 142, preferably of brass, is mounted over spacer 136 by means of the remaining tapped holes 128 in block 124. In use, probe 10 is inserted into slot or clearance 12 so that block 124 rests on lip 22 and the assembly is then moved along the slot to obtain the desired measurements of slot width. Due to the balanced, heavy configuration of this assembly, probe wobbling and cocking during movement are essentially eliminated.

FIG. 9 illustrates schematically the layers of an alternative, more robust probe structure according to the invention, which is particularly useful for wider slots or clearances. A central layer 144 of insulative adhesive is laminated on each side to a layer 146 of polyimide material such as Kapton film made by the E. I. DuPont de Nemours Company of Wilmington, Del. This laminate is then laminated on each side to a layer 148 of insulative adhesive. Then probe and guard electrode layers 150, of the type previously described, are laminated on each side and etched, followed by layers 152 of insulative adhesive. Then, window and guard electrode layers 154 are laminated on each side and etched to produce the finished probe, ready for field application of manually peelably adhered layers. When the thickness and stiffness of the probe are increased by thickening the insulative layer between the two probe electrode and guard electrode layers 150, the gain of the probe remains essentially unchanged, making changes in read-out circuitry unnecessary.

Figure 10:
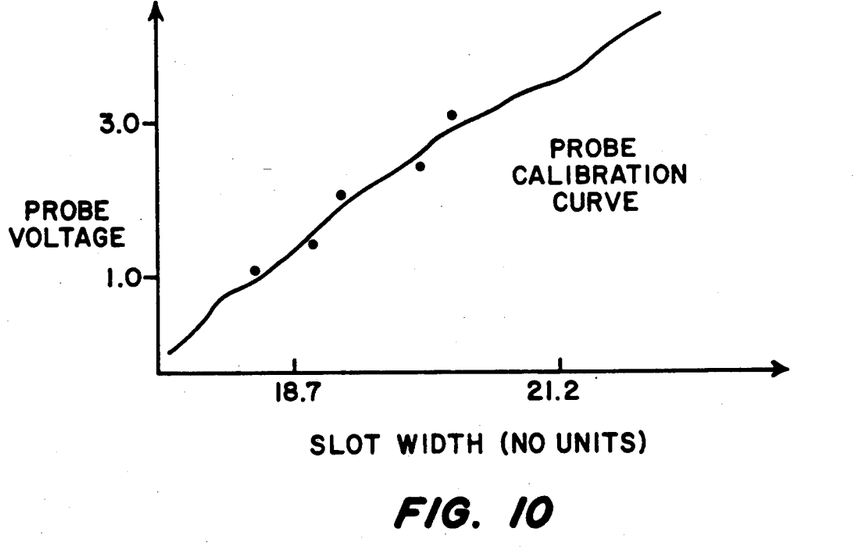
FIG. 10 shows a typical calibration curve for a probe according to the invention, in which probe voltage is plotted as a function of slot width.
Figure 11:
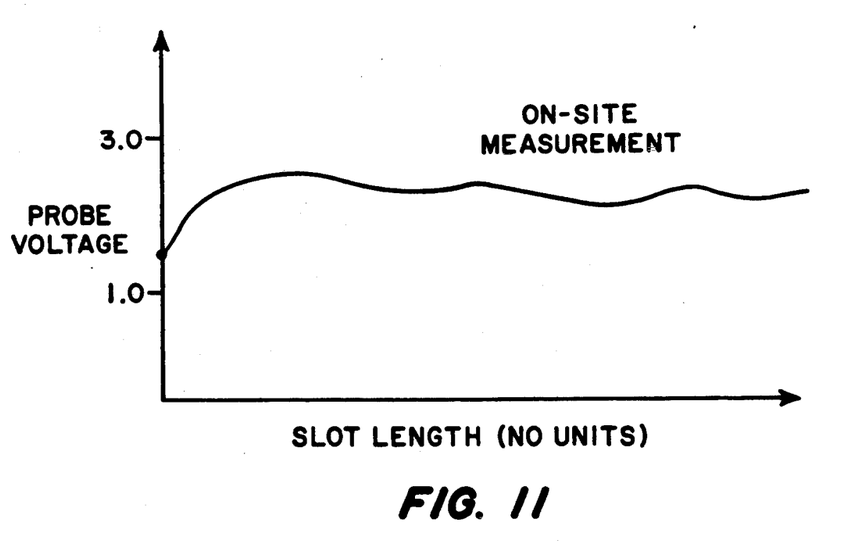
FIG. 11 shows a typical on-site measurement curve for such a probe, in which probe voltage is plotted as a function of slot length.

Probes made in the manner previously described may be calibrated using familiar techniques. Essentially, the calibration process requires the preparation of two or more standard width slots in which the probe may be tested. Measurements of its output voltage are taken and plotted against slot width in the manner shown in FIG. 10. Of course, those skilled in the art will recognize that such data also may be stored in various formats in an appropriately programmed computer. Once the response of the probe is known, the span of the signal conditioning unit of FIG. 1 is adjusted and the probe may be used in the field. In field applications, the probe is inserted into the slot of interest and drawn along the slot while its output voltage is monitored and sampled to produce a plot of voltage against slot length in the manner shown in FIG. 11. Knowing the measured voltage at a given point along the length of the slot, one can readily determine from information such as shown in FIG. 10 just what the slot width is at that location. Again, such a comparison can be done electronically, if preferred.

Having described our invention in sufficient detail to enable those skilled in the art to make and use it, we claim and desire to secure Letters Patent for:

1. In a capacitance probe for measuring the width of a slot or other clearance between electrically conductive parts, the probe being of the type including at least one thin, flat probe electrode having front and back sides, a first layer of dielectric material fixedly adhered to said front side, a second layer of dielectric material fixedly adhered to said back side, and a thin, flat guard electrode fixedly adhered to the outer surface of one of said layers of dielectric material, said guard electrode having at least one opening through its thickness opposite said probe electrode to define the active area of the probe, the improvement comprising:
   a first layer of high lubricity, electrically insulative material manually peelably adhered to the outer surface of said guard electrode,
   the thickness of said manually peelable layer being selectable to produce in the probe a total nominal thickness to optimally position the probe for accurate measurement of the width of said slot or clearance.

2. A capacitance probe according to claim 1, wherein said probe comprises a further thin, flat guard electrode fixedly adhered to the outer surface of the other of said layers of dielectric material, said further guard electrode also having at least one opening through its thickness opposite said probe electrode to define a further active area of the probe, further comprising a second layer of high lubricity, electrically insulative material manually peelably adhered to the outer surface of said further guard electrode.

3. In a capacitance probe for measuring the width of a slot or other clearance between electrically conductive parts, the probe being of the type including at least one thin, flat probe electrode having front and back sides, a first layer of dielectric material fixedly adhered to said front side, a second layer of dielectric material fixedly adhered to said back side, and a thin, flat guard electrode fixedly adhered to the outer surface of at least one of said layers of dielectric material, said guard electrode having an opening through its thickness opposite said probe electrode to define the active area of the probe, the improvement comprising:
   a plurality of perforations through the thickness of said guard electrode to define said active area, said perforations being located opposite said probe electrode; whereby due to the presence of said perforations, the area of said probe electrode must be larger to expose a given active area of said probe electrode but maintain substantially the same active area and sensitivity as a probe not having said plurality of perforations,
   whereby said larger area of said probe electrode enables the probe to measure the width of such a slot or clearance over an enlarged area of the length or depth or both of such a slot or clearance than would be achievable with a probe not having said plurality of perforations but having substantially the same active area and sensitivity.

4. In a capacitance probe for measuring the width of a slot or other clearance between electrically conductive parts, the probe being of the type including at least one thin, flat probe electrode having front and back sides, a first layer of dielectric material fixedly adhered to said front side, a second layer of dielectric material fixedly adhered to said back side, and a thin, flat guard electrode fixedly adhered to the outer surface of at least one of said layers of dielectric material, said guard electrode having at least one opening through its thickness opposite said probe electrode to define the active area of the probe, the improvement comprising:
   an electrically conductive carrier block for the probe, said block having a substantially flat side for attachment of the probe;
   electrically conductive attachment means piercing the probe through said probe electrode at a total of at least one point and through said guard electrode at a total of at least one point for securing the probe and electrically connecting said electrodes to said flat side with the portion of the probe comprising said active area extending beyond the perimeter of said flat side to permit insertion of said portion of the probe into said a slot or clearance.

5. A capacitance probe according to claim 2, wherein the improvement further comprises said portion of the probe having opposite side edges extended beyond said flat side and a lower edge extended between said opposite side edges, said opposite side edges being tapered toward said lower edge in the direction away from said carrier block, said tapered opposite side edges facilitating movement of said portion of the probe into and along said slot or clearance.

6. A capacitance probe according to claim 4, wherein said attachment means comprises a plurality of electrically conductive screws piercing the probe and threaded into said carrier block, there being at least one of said screws separately electrically engaging said probe electrode and at least one of said screws separately electrically engaging said guard electrode.

7. A capacitance probe for measuring the width of a slot or other clearance between electrically conductive parts, comprising:
   at least one thin, flat probe electrode having front and back sides;
   a first layer of dielectric material fixedly adhered to said front side;
   a second layer of dielectric material fixedly adhered to said back side;
   a thin, flat guard electrode fixedly adhered to the outer surface of one of said layers of dielectric material, said guard electrode having an opening through its thickness opposite said probe electrode to define the active area of the probe;
   a first layer of high lubricity material manually peelably adhered to the outer surface of said guard electrode;
   the thickness of said manually peelable layer being selectable to produce in the probe a total nominal thickness to optimally position the probe for accurate measurement of the width of such a slot or clearance;

a plurality of perforations through the thickness of said guard electrode to define said active area, said perforations being located opposite said probe electrode; whereby due to the presence of said perforations, the area of said probe electrode must be larger to expose a given active area of the probe but maintain substantially the same active area and sensitivity as a probe not having said plurality of perforations, whereby said larger area of said probe electrode enables said probe to measure the width of such a slot or clearance over an enlarged area of the length or depth or both of such a slot or clearance than would be achievable with a probe not having said plurality of perforations but having substantially the same active area and sensitivity;

an electrically conductive carrier block for the probe, said block having a substantially flat side for attachment of the probe; and electrically conductive attachment means piercing the probe through said probe electrode at a total of at least one point and through said guard electrode at a total of at least one point for securing and electrically connecting the probe to said flat side with the portion of the probe comprising said active area extending beyond the perimeter of said flat side to permit insertion of said portion of the probe into said slot or clearance.

8. A capacitance probe according to claim 7, wherein said portion of the probe comprises opposite side edges extended beyond said flat side and a lower edge extended between said opposite side edges, said opposite side edges being tapered toward said lower edge in the direction away from said carrier block, said tapered opposite side edges facilitating movement of said portion of the probe into and along said slot or clearance.

9. A capacitance probe according to claim 7, wherein said attachment means comprises a plurality of electrically conductive screws piercing the probe and threaded into said carrier block, there being at least one of said screws separately electrically engaging each of said probe electrode and said guard electrode.

10. A capacitance probe according to claim 7, wherein said probe comprises a further thin, flat guard electrode fixedly adhered to the outer surface of the other of said layers of dielectric material, said further guard electrode also having at least one opening through its thickness opposite said probe electrode to define a further active area of the probe, further comprising a second layer of high lubricity, electrically insulative material manually peelably adhered to the outer surface of said further guard electrode.

11. In a capacitance probe for measuring the width of a slot or other clearance between electrically conductive parts, the probe being of the type including at least one thin, flat probe electrode having front and back sides, a first layer of dielectric material fixedly adhered to said front side, a second layer of dielectric material fixedly adhered to said back side, and a thin, flat guard electrode fixedly adhered to the outer surface of at least one of said layers of dielectric material, said guard electrode having an opening through its thickness opposite said probe electrode to define the active area of the probe, the improvement comprising:

at least a second, thin flat probe electrode having front and back sides, one of said first and second layers of dielectric material being fixedly adhered to either the front or back side of said second probe electrode;

a third layer of dielectric material fixedly adhered to the other of said front or back side of said second probe electrode; and at least a second, thin flat guard electrode fixedly adhered to the outer surface of said third layer, said probe electrodes being positioned opposite each other in the probe, whereby any tendency of the probe electrodes to bow may be minimized by adhering them to said layers so that any bowing will occur in offsetting directions.

12. A capacitance probe for measuring the width of a slot or other clearance between electrically conductive parts, comprising:

at least one thin, flat probe electrode having front and back sides;

a first layer of dielectric material fixedly adhered to said front side;

a second layer of dielectric material fixedly adhered to said back side;

a thin, flat guard electrode fixedly adhered to the outer surface of one of said layers of dielectric material, said guard electrode having an opening through its thickness opposite said probe electrode to define the active area of the probe;

a first layer of high lubricity material manually peelably adhered to the outer surface of said guard electrode;

the thickness of said manually peelable layer being selectable to produce in the probe a total nominal thickness to optimally position the probe for accurate measurement of the width of such a slot or clearance;

a plurality of perforations through the thickness of said guard electrode to define said active area, said perforations being located opposite said probe electrode; whereby due to the presence of said perforations, the area of said probe electrode must be larger to expose a given active area of the probe but maintain substantially the same active area and sensitivity as a probe not having said plurality of perforations, whereby said larger area of said probe electrode enables said probe to measure the width of such a slot or clearance over an enlarged area of the length or depth or both of such a slot or clearance than would be achievable with a probe not having said plurality of perforations but having substantially the same active area and sensitivity.

13. A capacitance probe according to claim 12, wherein said probe comprises a further thin, flat guard electrode fixedly adhered to the outer surface of the other of said layers of dielectric material, said further guard electrode also having at least one opening through its thickness opposite said probe electrode to define a further active area of the probe, further comprising a second layer of high lubricity, electrically insulative material manually peelably adhered to the outer surface of said further guard electrode.

14. A capacitance probe for measuring the width of a slot or other clearance between electrically conductive parts, comprising:

at least one thin, flat probe electrode having front and back sides;

a first layer of dielectric material fixedly adhered to said front side;

a second layer of dielectric material fixedly adhered to said back side;

a thin, flat guard electrode fixedly adhered to the outer surface of one of said layers of dielectric material, said guard electrode having an opening through its thickness opposite said probe electrode to define the active area of the probe;

a first layer of high lubricity material manually peelably adhered to the outer surface of said guard electrode;

the thickness of said manually peelable layer being selectable to produce in the probe a total nominal thickness to optimally position the probe for accurate measurement of the width of such a slot or clearance;

an electrically conductive carrier block for the probe, said block having a substantially flat side for attachment of the probe; and electrically conductive attachment means piercing the probe through said probe electrode at a total of at least one point and through said guard electrode at a total of at least one point for securing and electrically connecting the probe to said flat side with the portion of the probe comprising said active area extending beyond the perimeter of said flat side to permit insertion of said portion of the probe into said slot or clearance.

15. A capacitance probe according to claim 14, wherein said probe comprises a further thin, flat guard electrode fixedly adhered to the outer surface of the other of said layers of dielectric material, said further guard electrode also having at least one opening through its thickness opposite said probe electrode to define a further active area of the probe, further comprising a second layer of high lubricity, electrically insulative material manually peelably adhered to the outer surface of said further guard electrode.

16. A capacitance probe for measuring the width of a slot or other clearance between electrically conductive parts, comprising:

at least one thin, flat probe electrode having front and back sides;

a first layer of dielectric material fixedly adhered to said front side;

a second layer of dielectric material fixedly adhered to said back side;

a thin, flat guard electrode fixedly adhered to the outer surface of one of said layers of dielectric material, said guard electrode having an opening through its thickness opposite said probe electrode to define the active area of the probe;

a plurality of perforations through the thickness of said guard electrode to define said active area, said perforations being located opposite said probe electrode; whereby due to the presence of said perforations, the area of said probe electrode must be larger to expose a given active area of the probe but maintain substantially the same active area and sensitivity as a probe not having said plurality of perforations;

whereby said larger area of said probe electrode enables said probe to measure the width of such a slot or clearance over an enlarged area of the length or depth or both of such a slot or clearance than would be achievable with a probe not having said plurality of perforations but having substantially the same active area and sensitivity;

an electrically conductive carrier block for the probe, said block having a substantially flat side for attachment of the probe; and electrically conductive attachment means piercing the probe through said probe electrode at a total of at least one point and through said guard electrode at a total of at least one point for securing and electrically connecting the probe to said flat side with the portion of the probe comprising said active area extending beyond the perimeter of said flat side to permit insertion of said portion of the probe into said slot or clearance.

* * * * *